United States Patent Office 3,732,107
Patented May 8, 1973

3,732,107
PHOTOPOLYMERIZABLE COPYING
COMPOSITION
Raimund Josef Faust, Wiesbaden-Biebrich, Germany, assignor to Kalle Aktiengesellschaft, Wiesbaden-Biebrich, Germany
No Drawing. Filed Oct. 29, 1971, Ser. No. 193,985
Claims priority, application Germany, Nov. 2, 1970,
P 20 53 683.8
Int. Cl. G03c 1/68, 1/70
U.S. Cl. 96—115 P    13 Claims

ABSTRACT OF THE DISCLOSURE

This invention relates to a photopolymerizable copying composition comprising at least one binder, at least one photoinitiator, and at least one polymerizable unsaturated ester having the formula

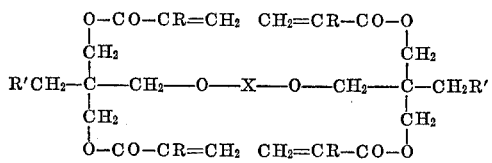

in which

R is selected from the group consisting of hydrogen or a methyl group,
R' is selected from the group consisting of hydrogen, a methyl group, or —O—CO—CR=CH$_2$, and
X is a diacyl group derived from a dicarboxylic acid having 2 to 12 carbon atoms.

---

This invention relates to a novel photopolymerizable copying composition which may be either in liquid form or in the form of a solid layer on a support, and which contains, as essential components, at least one binder, at least one polymerizable compound, and at least one photoinitiator.

Photopolymerizable compositions as used at present as copying layers in the reproduction field contain photopolymerizable compounds, e.g. esters of acrylic or methacrylic acid, particularly those of acrylic acid, with polyhydric aliphatic alcohols. Examples thereof are the following monomers: hexanediol-(1,6)-diacrylate, triethyleneglycol diacrylate, polyethyleneglycol diacrylate, neopentyl glycol diacrylate, diglycerol diacrylate, trimethylol propane triacrylate, pentaerythritol-tetraacrylate, and dipentaerythritol-hexaacrylate.

The photopolymerizable compositions generally harden the more rapidly upon the action of light and are cross-linked the more, i.e. are the more light-sensitive, the greater the number of acrylic ester groups in the monomer molecule. But, on the other hand, it is of advantage not to select the number of acrylic ester groups per molecule too high, since then premature cross-linkages easily may occur in the monomer, i.e. the stabilization of such compositions is impeded. From the point of view of a balance between these properties, pentaerythritol-tetraacrylate is a particularly favorable monomer.

Liquid monomers are, however, preferred for use in photopolymerizable compositions, because crystallization, particularly in copying compositions and in the copying materials prepared therefrom, normally causes nonuniformity and incompatibility within the layer and finally results in defective reproductions.

In order to produce copying layers of satisfactory strength from such liquid monomers and, further, to impart additional desirable properties to the copying composition, both prior to and after exposure, organic polymers are added as binders to such copying compositions. Advantageously, the monomer and the polymer to be added thereto are so attuned to each other that the monomer acts as a compatible plasticizer for the polymer and a non-sticky layer is produced in spite of a high monomer proportion.

Further, it is of importance for the monomer to be practically nonvolatile, so that it is not lost in uncontrollable quantities during the coating processes, in which a solution of the copying composition is usually dried with heating.

Trimethylol ethane triacrylate, for example, which permits the formulation of very light-sensitive and efficient copying compositions, has an undesirably high volatility. Further, layers prepared with this compound have a relatively strong sticking tendency.

Pentaerythritol tetraacrylate, on the other hand, is only slightly volatile and permits the preparation of nearly non-tacky photopolymer layers, but this acrylate is a solid compound easily crystallizing at room temperature, which, as noted above, is unfavorable for the intended use.

Therefore, attempts have been made to prepare acrylic esters of pentaerythritol which are as viscous as possible and have as low as possible a crystallizing tendency.

According to the teaching of German published patent application (DAS) No. 1,267,547, this is achieved by only partially esterifying pentaerythritol with acrylic acid, viz. to a stage corresponding to the triacrylate, and leaving the remainder of the OH groups free, or, alternatively, further modifying them by means of cumbersome processes, for example by reaction with diazomethane, alkylene oxides, and chloroalkyl ethers.

Due to the manner in which they were produced, all these monomers of the pentaerythritol triacrylate type, which by themselves are very valuable monomers with very low volatility and high light-sensitivity, invariably contain varying amounts of the easily crystallizing tetraacrylate, which sooner or later will partially crystallize from the monomer during storage. This crystallization may just as well occur in the photopolymerizable composition, resulting in grave risks for the quality of the copying material prepared from such monomers.

The present invention provides novel photopolymerizable monomers which do not have the described disadvantages of the prior art compounds.

According to the present invention, a novel photopolymerizable copying composition is provided which contains, as the essential components, at least one binder, at least one polymerizable compound, and at least one photoinitiator. The polymerizable compound is at least one unsaturated ester of the general Formula I:

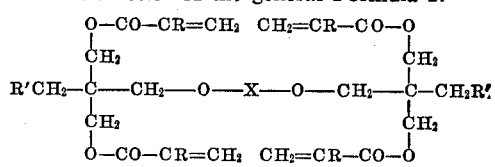

wherein

R is hydrogen or a methyl group,
R' is hydrogen, or a methyl group, or a group of the formula —O—CO—CR=CH$_2$, and
X is a diacyl group derived from a dicarboxylic acid having 2 to 12 carbon atoms.

The copying composition according to the invention may be used commercially in the form of a solution or dispersion, i.e. as a so-called photoresist composition, which is applied by the consumer to an individual support, for example for chemical milling or for the production of printed circuits, and is then dried, exposed and developed. Alternatively, the copying composition of the invention may be marketed in the form of a solid layer on a support, i.e. as a light-sensitive reproduction material from which e.g., printing plates for planographic, relief, or intaglio printing may be produced.

The copying compositions and copying materials according to the invention have a very god light-sensitivity and yield printing plates of high abrasion resistance, which permit very long runs. The copying layers display practically no tackiness, although the monomers do not tend to crystallize.

The monomers used according to the invention are known per se, for example from "Lakokrasotschnye materialy i ich upimenenie" (Lacquers and Dyestuffs and their Use), 1961, No. 6, 26, and 1965, No. 4, 8. Their polymerization is described, but no mention is made of their light-sensitivity or their capability of photopolymerizing under the action of suitable initiators. Therefore, it was not possible to conclude from this publication that these monomers are suitable for the production of particularly advantageous photopolymerizable copying materials.

The monomers may be easily prepared by the reaction of dicarboxylic acid dihalides, preferably dicarboxylic acid dichlorides, with appropriate polyhydric alcohols, which are partially esterified with acrylic or methacrylic acid. Polyhydric alcohols which are particularly suitable are: trimethylol ethane, trimethylol propane, and pentaerythritol. The partial esters are produced in known manner by esterification of these alcohols with acrylic acid or methacrylic acid. The esterification process is performed such that, on the average, slightly more than one OH group remains unesterified per molecule of the polyhydric alcohol. In many cases, it may be of advantage to use partially esterified compounds in which the OH group content exceeds that of the theoretical value of the monohydroxy compound by up to 20 percent. In this manner, it is safely avoided that the partial esters and, consequently, the end products contain a noticeable amount of completely acrylated alcohol, e.g. pentaerythritol tetraacrylate, which would give rise to trouble in the light-sensitive layer. Further, it is of advantage for the partial ester to contain a small proportion of components with two free OH groups, because in this case, during the subsequent reaction with dicarboxylic acid dihalide, a correspondingly small proportion of higher molecular weight products are produced which have a favorable influence upon the copying composition because of their crystallization inhibiting effect, their low vapor pressure, and their high viscosity.

The dicarboxylic acid dihalides to be employed according to the invention may be derived from saturated or unsaturated, aliphatic or cycloaliphatic, or aromatic dicarboxylic acids. Examples of suitable dicarboxylic acids are: oxalic acid, malonic acid, succinic acid, glutaric acid, adipic acid, pimelic acid, suberic acid, azelaic acid, sebacic acid, dodecane diacid, benzyl-malonic acid, chlorosuccinic acid, acetyl-malic acid, benzoyl-aspartic acid, maleic acid, itaconic acid, citraconic acid, cyclopentane-1,3,-dicarboxylic acid, cyclohexane-3,6-dicarboxylic acid, terephthalic acid, isophthalic acid, 5-chloro-isophthalic acid, 2-methyl-terephthalic acid, 2-methoxy-terephthalic acid, and others.

In addition to photoinitiators, binders and the polymerizable compounds described above, the copying composition according to the invention may contain further additives, such as:

inhibitors, to prevent thermal polymerization of the compounds;
hydrogen donors;
substances which modify the sensitometric properties of the layers;
dyestuffs;
colored or uncolored pigments;
color precursors;
indicators;
plasticizers;
and the like.

Advantageously, these components should be so selected that they absorb as little as possible within the actinic range which is of importance for the initiating process.

A variety of substances may be used as photoinitiators in the copying composition according to the invention, for example: benzoin; benzoin ethers; multi-nuclear quinones, such as 2-ethyl-anthraquinone; acridine derivatives, such as 9-phenyl-acridine, 9-p-methoxyphenyl-acridine, 9-acetylamino-acridine, or benz(a)-acridine; phenazine derivatives, such as 9,10-dimethyl-benz(a)-phenazine, 9-methyl-benz(a)-phenazine, or 10-methoxy-benz(a)-phenazine; quinoxaline derivatives, such as 6, 4′,4″ - trimethoxy-2,3-diphenyl-quinoxaline or 4′,4″-dimethoxy - 2,3 - diphenyl - 5 - aza-quinoxaline; quinazoline derivatives, and others.

Numerous soluble organic polymers may be employed as binders. The following are mentioned as examples: polyamides, polyvinyl esters, polyvinyl acetals, polyvinyl ethers, polyacrylic esters, polymethacrylic esters, polyesters, alkyd resins, polyacrylamide, polyvinyl alcohol, polyethylene oxide, polydimethyl acrylamide, polyvinyl pyrrolidone, polyvinyl methyl formamide, polyvinyl methyl acetamide, and copolymers of the monomers forming these homopolymers.

Further, natural substances or modified natural substances, such as gelatin, cellulose ethers and the like, may be used as binders.

Advantageously, those binders are used which are soluble or at least swellable in aqueous alkaline solutions, because layers containing such binders may be developed by means of the preferred aqueous-alkaline developers. Binders of this type may contain the following groups, e.g.: —COOH, —$PO_3H_2$, —$SO_3H$, —$SO_2NH_2$, —$SO_2$—NH—CO—, and the like. Examples of such binders, which are preferably used, are: maleic resins, polymers of N-(p-tolylsulfonyl)-carbamic acid-($\beta$-methacryloyloxy)-ether ester, and copolymers of this and similar monomers with other monomers (as described in copending application Ser. No. 149,391), and copolymers of styrene and maleic anhydride, and of methyl methacrylate and methacrylic acid.

Small quantities of other photopolymerizable monomers also may be added to the copying compositions according to the invention, taking care, of course, that the above described advantages resulting from the use of the inventive monomers in the photopolymerizable composition are not unduly reduced by such addition.

The copying composition according to the invention may be used for the following purposes, e.g.: as copying layers for the photomechanical preparation of printing forms for relief printing, planographic printing, intaglio printing or screen printing, or for the preparation of relief copies, e.g. Baille texts, or individual copies, tanned images, pigment images, and the like. Further, the copying compositions according to the invention may be used for the photomechanical production of etch resists, which may be used for making name plates or printed circuits, or for chemical milling. The copying compositions according to the invention are of particular importance as copying layers for the photomechanical production of planographic printing forms and of etch resists, and in particular as presensitized copying materials.

Although the copying compositions according to the invention are relatively insensitive to the oxygen of the air, it is frequently advantageous to substantially protect the compositions from the access to oxygen during photopolymerization. This may be achieved, e.g., by incorporating paraffin, which collects at the surface of the layer and forms an oxygen barrier.

When the composition is used in the form of a thin copying layer, it is advisable to apply a suitable cover film of low oxygen permeability. The film may be self-supporting and may be peeled off from the copying layer prior to development. Polyester films are suitable for this purpose, for example. Alternatively, the cover film may consist of a material which is dissolved by the developer liquid, or which is at least removed from the unhardened areas during development. Suitable materials for this purpose include, e.g., waxes, polyvinyl alcohol, polyphosphates, sugar, and the like.

Suitable supporting materials for the copying materials prepared from the copying compositions of the invention are, e.g.: metal foils, such as aluminum, steel, zinc and copper foils; plastic films, such as polyethylene terephthalate films or cellulose acetate films; and screen printing supports, such as Perlon gauze. In many cases, it is advantageous to subject the surface of the support to a preliminary chemical or mechanical treatment, with the object of properly adjusting the adhesion of the layer or of reducing the reflection of the support within the actinic range of the copying layer (antihalation).

The light-sensitive materials in which the copying composition according to the invention is employed are produced in known manner.

The copying composition may be dissolved or dispersed in a solvent and the resulting solution or dispersion may be applied as a film to the selected support by casting, spraying, immersion, roller application, and the like, and then dried. Thick layers (e.g. layers of 250μ or more) preferably are produced in the form of self-supporting films, by extrusion or compression, and are then laminated to the support.

The copying materials are processed in known manner.

The following examples serve to illustrate different embodiments of the invention, but the invention is not limited to the embodiments described. The relation between parts by weight and parts by volume corresponds to that between grams and milliliters. Percentages are by weight, unless otherwise stated.

EXAMPLE 1

A planographic printing plate is prepared as follows:
A coating solution containing 1.4 parts by weight of a methylmethacrylate/methacrylic acid copolymer having an average molecular weight of 60,000 and an acid number of 93.7,
1.4 parts by weight of the monomer described below,
0.1 part by weight of 1,2-benzacridine (benz(a)-acridine),
0.02 part by weight of Supranol Blue GL (C.I. 50,335), and
13.0 parts by weight of ethyleneglycol monoethyl ether, is whirl-coated upon electrolytically roughened and anodized aluminum of 0.3 mm. thickness and dried.

In a xenon copying apparatus manufactured by Klimsch & Co., Frankfurt am Main, Germany (Type Bikop, Model Z) and having an output of 8 kw., the copying layer is exposed for 1 minute under a line/halftone combination original, side by side with a 21-step Eastman Kodak continuous tone grey wedge which has a density range of 0.05 to 3.05, with density increments of 0.15.

After exposure, the plate is wiped for about 1 minute with a developer containing 1.5 parts by weight of sodium metasilicate nonahydrate and 3 parts by weight of strontium-hydroxide octahydrate in 1,000 parts by weight of water and having a pH-value of 13, in order to remove the non-image areas, then rinsed with water, fixed by means of a 1 percent by weight phosphoric acid solution, and finally inked with black greasy ink.

The printing plate shows an excellent reproduction even of the finest screen dots. The relative light-sensitivity, measured by the number of fully blackened steps of the step wedge, is 9.

The monomer used in this example is prepared as follows:

In a three-necked flask provided with stirrer, dropping funnel, and attached drying tube, which had been carefully dried by heating and rinsing with pure nitrogen, 228 g. (1 mole) of trimethylolethane diacrylate, stabilized by the addition of 1 percent by weight of hydroquinone, are dissolved in 900 ml. of methylene chloride and mixed with 120 ml. of pyridine. A mixture of 91.5 g. (0.5 mole) of adipic acid dichloride and 50 ml. of methylene chloride is added dropwise, while agitating and taking care that the temperature is maintained below 30° C. After the dropwise addition, the mixture is further stirred for 1 hour at room temperature and then mixed with 500 ml. of methylene chloride. The pyridine hydrochloride which separates is drawn off with the aid of a pressure filter. The reaction mixture is washed once with 500 ml. of a 20 percent NaCl solution, and then three times with 500 ml. of water each, and finally dried over sodium sulfate. After removal of the solvent by distillation, an almost colorless, viscous product is obtained:

Yield _____percent__ 90–95
Saponification number:
  Calculated _____ 635
  Found _____ 598
Hydrogenation number:
  Calculated _____ 208
  Found _____ 184

The term "hydrogenation number" means the quantity of hydrogen in milliliters absorbed by 1 gram of the substance during catalytic hydrogenation at 25° C. and 760 torr.

EXAMPLE 2

A planographic printing plate is prepared as described in Example 1, except that instead of the photomonomer used in that example, 1.4 parts by weight of the reaction product of trimethylolethane diacrylate and oxalic acid dichloride are employed. The exposure time is 20 seconds. With a layer weighing 4.3 g./m.², four fully blackened steps of the step wedge are reproduced, and a total of 5 steps are clearly discernible.

In the following examples, the total number of discernible wedge steps is placed in brackets behind that of the fully blackened wedge steps.

The monomer referred to above is prepared analogously to the method described in Example 1.

Saponification number:
  Calculated _____ 673
  Found _____ 604
Hydrogenation number:
  Calculated _____ 195
  Found _____ 174

EXAMPLE 3

The procedure described in Example 1 is repeated, except that the monomer in the coating solution is replaced by 1.4 parts by weight of the reaction product of trimethylolethane diacrylate and itaconic acid dichloride. 7 (8) steps of the step wedge are reproduced.

The monomer is prepared analogously to Example 1.

Saponification number:
  Calculated _____ 612
  Found _____ 593
Hydrogenation number:
  Calculated _____ 222
  Found _____ 232

EXAMPLE 4

The procedure described in Example 1 is repeated, except that the monomer is replaced by 1.4 parts by weight of the reaction product of trimethylolethane diacrylate and terephthalic acid dichloride. 6 (9) steps are reproduced.

The monomer is characterized by the following data:

Saponification number:
  Calculated _____ 574
  Found _____ 570
Hydrogenation number:
  Calculated _____ 167
  Found _____ 178

EXAMPLE 5

Example 1 is repeated, except that the monomer in the coating solution is replaced by 1.4 parts by weight of the reaction product of trimethylol propane diacrylate and succinic acid dichloride. 4 (6) steps are reproduced.

The monomer is characterized by the following data:

Saponification number:
  Calculated _____ 594
  Found _____ 574
Hydrogenation number:
  Calculated _____ 173
  Found _____ 181

EXAMPLE 6

Example 1 is repeated, using 1.4 parts by weight of the reaction product of trimethylol propane diacrylate and adipic acid dichloride as the monomer. 7 (8) steps of the step wedge are reproduced.

The monomer is characterized by the following data:

Saponification number:
  Calculated _____ 566
  Found _____ 544
Hydrogenation number:
  Calculated _____ 164
  Found _____ 154

EXAMPLE 7

Example 1 is repeated, using 1.4 parts by weight of the reaction product of trimethylol propane diacrylate and sebacic acid dichloride as the monomer. 7 (8) steps of the step wedge are reproduced.

The monomer is characterized by the following data:

Saponification number:
  Calculated _____ 517
  Found _____ 521
Hydrogenation number:
  Calculated _____ 150
  Found _____ 136

EXAMPLE 8

Example 1 is repeated, using 1.4 parts by weight of the reaction product of pentaerythritol triacrylate and glutaric acid dichloride as the monomer. 7 (9) steps of the step wedge are reproduced.

The monomer is characterized by the following data:

Saponification number:
  Calculated _____ 649
  Found _____ 647
Hydrogenation number:
  Calculated _____ 212
  Found _____ 180

EXAMPLE 9

Example 1 is repeated, using 1.4 parts by weight of the reaction product of pentaerythritol triacrylate and adipic acid dichloride as the monomer. 7 (9) steps of the step wedge are reproduced.

The monomer is characterized by the following data:

Saponification number:
  Calculated _____ 635
  Found _____ 598
Hydrogenation number:
  Calculated _____ 208
  Found _____ 184

EXAMPLE 10

Example 1 is repeated, using 1.4 parts by weight of the reaction product of pentaerythritol triacrylate and sebacic acid dichloride as the monomer. 5 (6) steps of the step wedge are reproduced.

The monomer is characterized by the following data:

Saponification number:
  Calculated _____ 598
  Found _____ 550
Hydrogenation number:
  Calculated _____ 193
  Found _____ 195

EXAMPLE 11

Example 1 is repeated, using 1.4 parts by weight of the reaction product of pentaerythritol trimethacrylate and oxalic acid dichloride as the monomer. 9 (10) steps of the step wedge are reproduced.

The monomer is characterized by the following data:

Saponification number:
  Calculated _____ 612
  Found _____ 616
Hydrogenation number:
  Calculated _____ 200
  Found _____ 178

EXAMPLE 12

Example 1 is repeated, using 1.4 parts by weight of the reaction product of pentaerythritol trimethacrylate and sebacic acid dichloride as the monomer. 8 (9) steps of the step wedge are reproduced.

The monomer is characterized by the following data:

Saponification number:
  Calculated _____ 530
  Found _____ 545
Hydrogenation number:
  Calculated _____ 173
  Found _____ 153

As is shown by these examples, the copying materials described in Examples 1 to 12 have an excellent light-sensitivity, even without an oxygen-impermeable cover film. The printing plates prepared from them yield at least 100,000 flawless prints when used for offset printing in a Dualith printing machine.

It will be obvious to those skilled in the art that many modifications may be made within the scope of the present invention without departing from the spirit thereof, and the invention includes all such modifications.

What is claimed is:

1. A photopolymerizable copying composition comprising at least one binder, at least one photoinitiator, and at least one polymerizable unsaturated ester having the formula

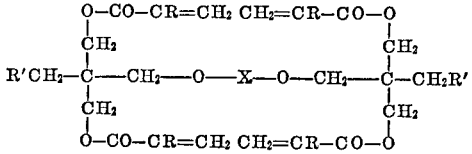

in which
R is selected from the group consisting of hydrogen or a methyl group,
R' is selected from the group consisting of hydrogen, a methyl group, or —O—CO—CR=CH$_2$, and
X is a diacyl group derived from a dicarboxylic acid having 2 to 12 carbon atoms.

2. A composition according to claim 1 in the form of a solid light-sensitive layer on a support.

3. A composition according to claim 1 in which X is the diacyl radical of an aliphatic dicarboxylic acid having 2 to 8 carbon atoms.

4. A composition according to claim 1 in which X is the diacyl radical of adipic acid.

5. A composition according to claim 1 in which the polymerizable unsaturated ester is the reaction product of trimethylolethane diacrylate and adipic acid dichloride.

6. A composition according to claim 1 in which the polymerizable unsaturated ester is the reaction product of trimethylolethane diacrylate and itaconic acid dichloride.

7. A composition according to claim 1 in which the polymerizable unsaturated ester is the reaction product of trimethylol propane diacrylate and succinic acid dichloride.

8. A composition according to claim 1 in which the polymerizable unsaturated ester is the reaction product of trimethylol propane diacrylate and adipic acid dichloride.

9. A composition according to claim 1 in which the polymerizable unsaturated ester is the reaction product of trimethylol propane diacrylate and sebacic acid dichloride.

10. A composition according to claim 1 in which the polymerizable unsaturated ester is the reaction product of pentaerythritol triacrylate and glutaric acid dichloride.

11. A composition according to claim 1 in which the polymerizable unsaturated ester is the reaction product of pentaerythritol triacrylate and adipic acid dichloride.

12. A composition according to claim 1 in which the polymerizable unsaturated ester is the reaction product of pentaerythritol trimethacrylate and oxalic acid dichloride.

13. A composition according to claim 1 in which the polymerizable unsaturated ester is the reaction product of pentaerythritol trimethacrylate and sebacic acid dichloride.

References Cited

UNITED STATES PATENTS

| | | | |
|---|---|---|---|
| 3,551,246 | 12/1970 | Bassemir et al. | 204—159.15 |
| 3,380,831 | 4/1968 | Cohen et al. | 96—115 R |
| 3,261,686 | 7/1966 | Celeste et al. | 96—115 P |

RONALD H. SMITH, Primary Examiner

U.S. Cl. X.R.

96—35.1; 204—159.23.